INVENTOR.
PAUL F. WILBER

INVENTOR.
PAUL F. WILBER

3,348,684
SUMP FILTER WITH INDICATOR
Paul F. Wilber, Richland, N.Y., assignor to Dollinger Corporation, Rochester, N.Y., a corporation of New York
Filed Jan. 26, 1966, Ser. No. 523,215
6 Claims. (Cl. 210—90)

ABSTRACT OF THE DISCLOSURE

An annular filter cartridge is removably mounted in a housing, which is connected to a suction pump and suspended in a sump. The liquid in the sump is normally sucked into the housing and through the cartridge into its bore and then to the pump. The bore of the cartridge is closed at its lower end by a spring-pressed piston, and communicates at its opposite end with the pump. When the cartridge becomes dirty, liquid flow therethrough is decreased, the suction is increased, and the piston is moved against the resistance of the associated spring. The piston rod is connected by a cam to an indicator on the exterior of the housing so that as the piston moves, its indicator is activated to indicate how dirty the cartridge is.

---

This invention relates to filters, and more particularly to a filter for filtering fluid being pumped through a lubricating or hydraulic system.

In pressurized lubricating and hydraulic systems it is common practice to pump the fluid through a filter before the fluid passes into the system. If the filter becomes clogged by repeated use, however, the flow of fluid through the filter is reduced, and inadequate quantities of fluid will be pumped to the system. Moreover, the dirtier the filter gets, the greater is the likelihood that undesirable quantities of foreign matter will be forced through the filter and into the system proper.

An object of this invention is to provide a novel filter unit having means for automatically indicating visually its operating efficiency.

A further object of this invention is to provide a relatively sturdy, compact filter unit having a removable filter element, and means for automatically indicating visually whether or not the filter element is in need of cleaning or replacing.

Other objects of the invention will be apparent hereinafter from the specification and from the recital of the appended claims, particularly when read in conjunction with the accompanying drawings.

Figure 1:
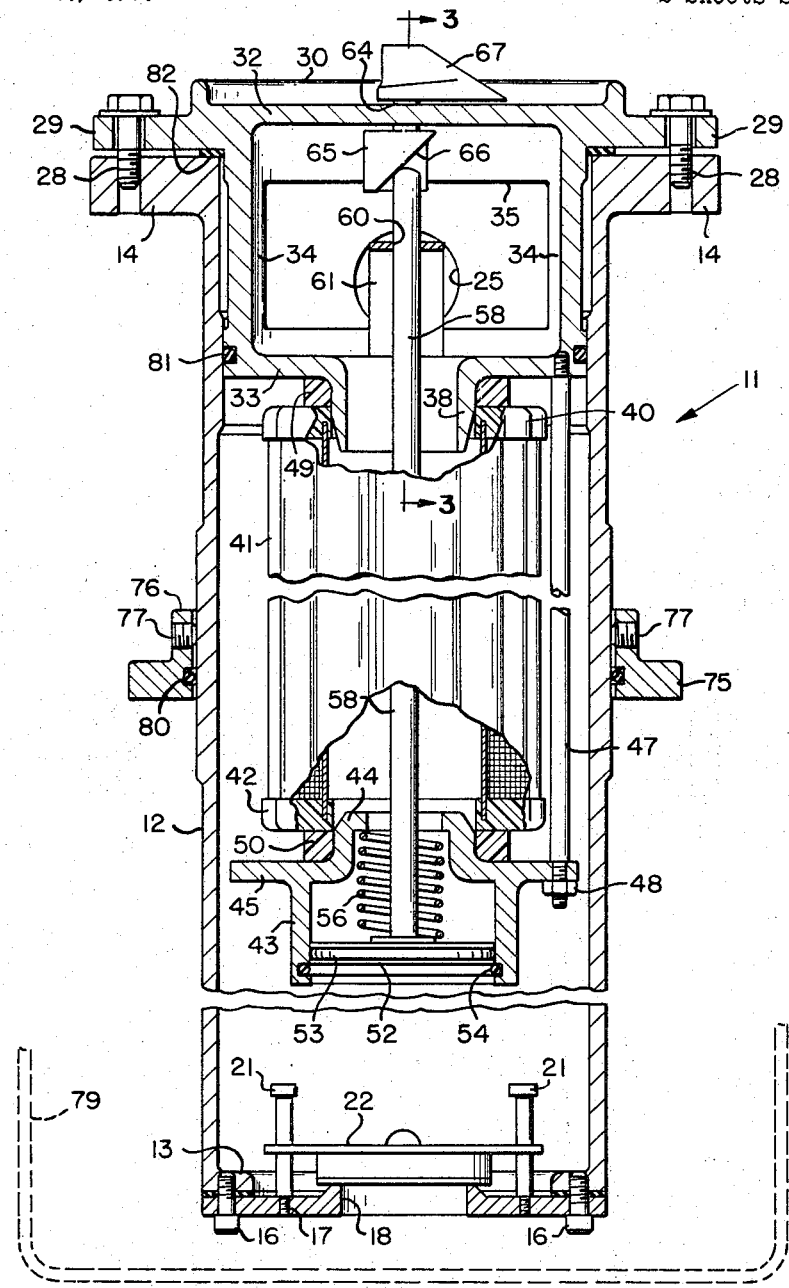
FIG. 1 is a fragmentary axial sectional view of a filter unit made in accordance with one embodiment of this invention.

Referring now to the drawings by numerals of reference, the filter unit 11 comprises a cylindrical housing 12, which has at its lower end a radially inwardly projecting flange 13, and at its upper end a pair of radially outwardly projecting lugs 14. Secured over the lower end of housing 12 by bolts 16, which thread into the flange 13, is an annular plate 17, the inner face of which is provided with an annular boss 18, which is disposed coaxially of the housing 12. Guided for axial sliding movement toward and away from the boss 18 by a plurality of pins 21, which are fastened to and project up from the inner face of the plate 17 parallel to the axis of the housing 12, is a normally closed, reciprocable check valve 22.

Adjacent its upper end the housing 12 is provided with a port 25 which may be internally-threaded for attachment of a conduit thereto.

Removably secured on the upper end of the housing 12 by bolts 28 is a cap member 30. The bolts 28 pass through slots in hook-shaped lugs 29, which project from diametrally opposite sides of the cap 30, and thread into the lugs 14 on housing 12. Cap 30 has upper and lower walls 32 and 33 connected by two diametrally opposite ribs 34 which are integral with the upper and lower walls 32, 33 and divide the median portion of the heighth of the cap into two ports 35, 36. The lower wall 33 has therethrough a central opening surrounded by a collar 38. This projects downwardly into the upper endcap 40 of a conventional, radial-fin type filter cartridge 41, so that the bore of the collar connects the interior of the cartridge through ports 35, 36 with port 25.

Removably secured in the lower end-cap 42 of the cartridge 41 is a cylinder or piston housing 43, which has at its upper end a boss 44 that projects into the lower end-cap of the cartridge. The cylinder has intermediate its ends an external, circumferential flange 45 that is disposed beneath the cartridge 41, in radially spaced relation to housing 12. Both the cartridge and the cylinder are removably suspended from the cap 30 by a plurality of rods 47, only one of which is illustrated in FIG. 1. Each rod 47 threads at its upper end into the lower wall 33 of the cap 30, and at its lower end is secured by a nut 48 to flange 45 of cylinder 43. Resilient, annular gaskets 49 and 50 are mounted on the bosses 38 and 44 so that when the nuts 48 are tightened, these opposite ends of the cartridge will be sealed.

Mounted to reciprocate in cylinder 43 is a piston 52, which carries an O-ring 53 for sealing against the inside of the wall of the cylinder. A snap-ring 54 limits the downward movement of the piston. Interposed between the cylinder and the upper end of the piston 52 is a coiled spring 56, which urges the piston 52 downwardly in the cylinder.

Figure 3:
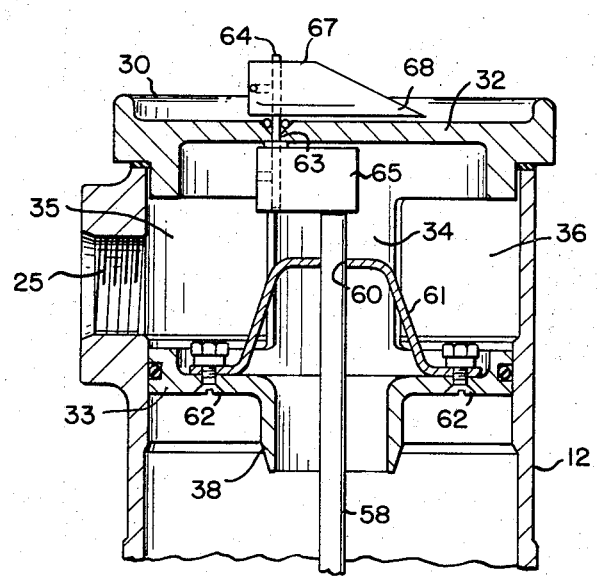
FIG. 3 is a fragmentary sectional view taken along the line 3—3 in FIG. 1 looking in the direction of the arrows, but with the unit's filter cartridge removed.

Secured at its lower end to the piston and extending upwardly through cartridge 41, and into the cap 30 is a piston rod 58. The rod 58 extends through the opening 60 formed in an inverted, generally U-shaped strap 61 (FIG. 3), opposite ends of which are secured to the lower wall 33 of cap 30 by means of conventional screw and nut combinations 62.

Rotatably journaled intermediate its ends in an opening 63 (FIG. 3) in the upper wall 32 of the cap 30, with its axis radially offset from the axial centerline of the cap, is a shaft 64. Secured to the lower end of the shaft 64 beneath wall 32 is a camming member 65, which has an inclined camming surface 66 (FIG. 1) that overlies the upper, rounded end of the piston rod 58. Secured to the upper end of shaft 64 above the wall 32 is a pointer 67. Member 67 swings across an indicator plate 71 (FIG. 2), which is secured on wall 32 beneath the member 67 by means of screws 72, or the like.

Surrounding the housing 12 and adjustable axially thereof is a mounting plate 75 (FIG. 1) that is of rectangular perimetral shape. Plate 75 has an annular collar portion 76, which is secured coaxilly of housing 12 by set screws 77 that thread radially through collar 76 to secure the plate 75 in an adjusted position along the housing. Plate 75 has in its corners elongate slots 78 through which mounting bolts (not illustrated) may pass to secure the plate to the top of a fluid reservoir or sump 79 (a portion of which is shown by broken lines in FIG.

1), so as to suspend the lower end of the housing 12 just above the bottom of the sump.

An O-ring 80 mounted in plate 75 provides a fluid tight seal between the mounting plate 75 and the housing. A similar O-ring 81 seated in a groove in the outer surface of cap 30 resiliently and sealingly engages the inner peripheral surface of the housing 12. An annular gasket 82 surrounds the cap 30 sealingly to engage the upper end of the housing 12.

In use, the housing 12 is suspended in a sump 79, or the like, with its lower end immersed in the fluid which is to be circulated under pressure through, for example, a hydraulic system; and the port 25 in the housing is connected by piping (not illustrated) to the pump, that is to provide the system pressure, and which in this case is assumed to be a vacuum pump. When the pump is not operating, the valve 22, the piston 52, the cam 65 and the indicator 67 will be in the positions illustrated in the drawing. The pointer 67 will, therefore, overlie or register with a portion A (FIG. 2) of the plate 71, which in practice is inscribed with the legend "Filter Is Clean." When the pump is started, the pressure at port 25 will be reduced to some value below atmospheric, so that fluid in the sump will force check valve 22 open (upwardly on the pins 21), and flow up, around filter cartridge 41, through this cartridge 41, and thence through the collar 38, one of the openings 35, 36, in wall 34, and through port 25 to the system. It will be understood, of course, that after passing through the system the fluid is returned to the sump 79.

Figure 2:
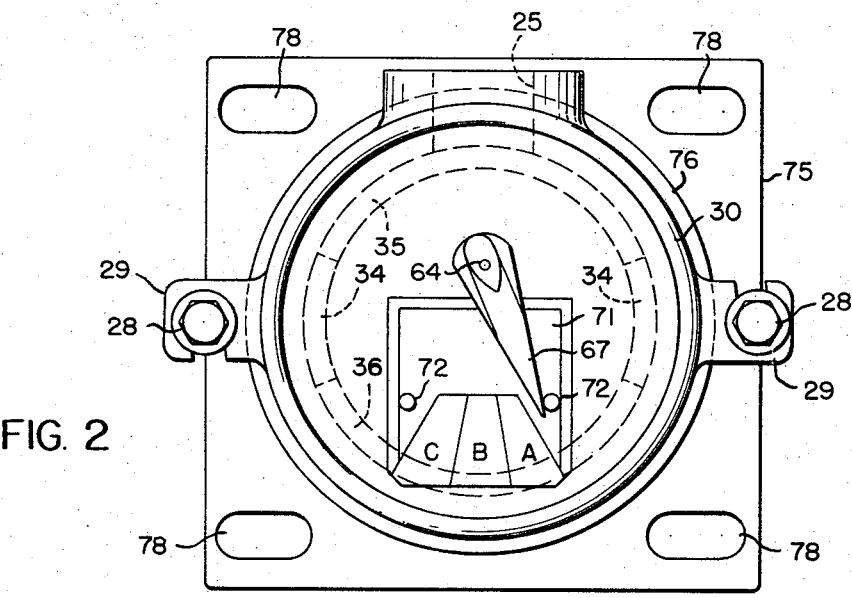
FIG. 2 is a plan view of this unit.

If as a result of continued use the cartridge 41 becomes so dirty that its pores begin to clog up, the rate of flow of the fluid through the cartridge 41 will diminish, and the vacuum created by the pump will increase. As this vacuum increases above a predetermined value, determined by the strength of spring 56, the piston 52 will be drawn upwardly against the resistance of the spring, thereby elevating rod 58. As this rod moves upwardly, its upper end, which engages inclined surface 66 on camming member 65, rotates the latter and indicator 67 clockwise (FIG. 2). This moves indicator to zone B (FIG. 2) on plate 71, which may be inscribed "Needs Cleaning." If the vacuum increases even further, as when the cartridge is exceptionally dirty, the indicator will be swung even further in a clockwise direction (FIG. 2) until it moves to zone C on the plate 71, which may be inscribed with the term "Danger." At some point between the "Needs Cleaning" and the Danger zones, the cartridge 41 should be removed and either replaced or cleaned.

To remove the cartridge, the screws 28 are loosened and the cap 30 is rotated slightly clockwise in FIG. 2 to swing the hook-shaped lugs from beneath the heads of the screws 28. The cap 30, cartridge 41 and housing 43 are then withdrawn as a unit, and after removal of the nuts 48 a new or clean cartridge is inserted between the cap 30 and housing 43. The assembly is then reinserted into the housing, and because two openings 35 and 36 are provided in the annular wall 34 of cap 30, one of them is bound to register with the port 25 regardless of which of the two lugs 29 is inserted beneath the head of a given screw 28. Similarly, the camming surface 66 will always be returned to its proper position of registry with the upper end of rod 58.

In the embodiment illustrated, the pointer 67 remains in the position to which it is moved by the piston rod 58, so that when the pump is shut down, for example, at the end of a work day, the night or maintenance crew will note if the indicator shows that the filter is dirty, and, if so, will remove and clean or replace the filter. If desired, however, a spring (not illustrated) can be connected to the pointer 67 to cause it to return to its extreme counterclockwise position in FIG. 2 whenever the pump to which the filter is connected is shut down.

From the foregoing it will be apparent that the novel filter disclosed herein provides a relatively simple and inexpensive means of avoiding damage to systems of the type described, which might otherwise occur if faulty or excessively dirty filters were to be employed unknowingly. The novel indicator means disclosed herein eliminates the need for periodically shutting down a pump and dismantling its filter unit in order to inspect its cartridge, thus saving in the course of a year many man hours heretofore wasted on such inspection. Moreover, the novel cartridge housing permits rapid removal and cleaning or replacement of a cartridge when necessary.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A filter comprising
   (a) a housing,
   (b) a porous filter element mounted in said housing,
   (c) means for connecting said housing to a pump for pumping fluid through said element, and
   (d) indicating means responsive to predetermined changes in the rate of flow of the fluid through said element to indicate the cleanliness of said element,
   (e) said filter element having a central bore,
   (f) said connecting means comprising
      (1) means for connecting one end of said bore to said pump, and
      (2) means for closing the opposite end of said bore so that fluid pumped through said element must flow radially through the pores in said element to be filtered thereby,
   (g) said housing surrounding said element in spaced relation thereto, and having therein a pair of spaced, fluid ingress and egress ports, respectively, one of which communicates with said one end of said bore for connecting said pump thereto, and the other of which communicates with the space between said element and said housing,
   (h) said closing means comprising a first member closing said opposite end of said bore and movable in one direction, when the pressure differential created by said pump between said bore and the outside of said element exceeds a predetermined value, and
   (i) said indicating means comprising
      (1) a second member having thereon indicia representative of different degrees of cleanliness of said element,
      (2) a third member mounted in operative relation to said second member, and movable relative thereto to register with different portions of said indicia, one of said second and third members being secured to the outside of said housing, and the other of said second and third members being movably mounted on the exterior of said housing, and
      (3) means operatively connecting said other of said second and third members to said first member for movement thereby, when said first member moves in said one direction.
2. A filter defined in claim 1, wherein
   (a) said housing comprises a hollow container having a cap removably secured in an opening in one end of said container, and including
   (b) means removably mounting said first member and said element on said cap for suspension thereby in said container, whereby upon removal of said cap from said container said first member and said element are withdrawn therewith as a unit.

3. A filter as defined in claim 2, wherein
(a) said first member is a piston reciprocable parallel to the axis of said bore,
(b) a rod projects from said piston in the direction of said cap,
(c) said third member is secured to the outer end of a shaft, which is journaled intermediate its ends in said cap to pivot about an axis parallel to said bore axis, and
(d) a cam is secured to the inner end of said shaft and has thereon a camming surface slidably engageable by said rod to effect pivotal movement of said shaft upon the movement of said first member in said one direction.

4. A filter as defined in claim 3, wherein
(a) said cap has a hollow portion which projects into said one end of said container, and which has therethrough two further ports, and
(b) means is provided for removably securing said cap to said container in one of two positions, in either of which two positions said camming surface is disposed in proper registry with said rod and one of said two further ports is in registry with said one of the first-named ports.

5. A filter as defined in claim 3, including means removably mounting said piston and said rod on said element, whereby upon removal of said cap from said container, said piston and said rod may be removed from said element.

6. A filter as defined in claim 4, including
(a) adjustable means on the exterior of said container for supporting the latter with said other of said first-named ports disposed in communication with a reservoir of fluid, and
(b) a check valve mounted on said container in operative relation to said other of said first-named ports to allow said fluid to flow only one way through the last-named port.

References Cited

UNITED STATES PATENTS

| 2,499,494 | 3/1950 | Greer | 210—90 |
| 2,678,134 | 5/1954 | Middleton | 210—90 |
| 3,052,206 | 9/1962 | Scavuzzo | 210—90 X |
| 3,103,952 | 9/1963 | Whiting | 210—90 X |
| 3,276,586 | 10/1966 | Rosaen | 210—90 |

REUBEN FRIEDMAN, *Primary Examiner.*

J. ADEE, *Assistant Examiner.*